US008015406B2

United States Patent
Lonardo et al.

(10) Patent No.: US 8,015,406 B2
(45) Date of Patent: Sep. 6, 2011

(54) METHOD TO CREATE AN OSI NETWORK LAYER 3 VIRTUAL PRIVATE NETWORK (VPN) USING AN HTTP/S TUNNEL

(75) Inventors: David Lonardo, Pembroke Pines, FL (US); Dirk Tennie, Miami Beach, FL (US)

(73) Assignee: Human 2, Inc., Pembroke Pines, FL (US)

( * ) Notice: Subject to any disclaimer, the term of this patent is extended or adjusted under 35 U.S.C. 154(b) by 653 days.

(21) Appl. No.: 12/109,084

(22) Filed: Apr. 24, 2008

(65) Prior Publication Data

US 2008/0270795 A1  Oct. 30, 2008

Related U.S. Application Data

(60) Provisional application No. 60/913,712, filed on Apr. 24, 2007.

(51) Int. Cl.
*H04L 9/00* (2006.01)

(52) U.S. Cl. .......................................... 713/168; 726/15

(58) Field of Classification Search .................. 713/168; 726/15
See application file for complete search history.

(56) References Cited

U.S. PATENT DOCUMENTS

2005/0273849 A1* 12/2005 Araujo et al. ................... 726/12
2008/0034420 A1* 2/2008 Chang ............................. 726/15
2008/0229137 A1* 9/2008 Samuels et al. ............... 713/600

* cited by examiner

*Primary Examiner* — Ellen Tran
(74) *Attorney, Agent, or Firm* — Feldman Gale, P.A.; Michael C. Cesarano

(57) ABSTRACT

A method of creating and using a virtual private network (VPN) client encrypts network communications to server/gateways using strong algorithms to ensure data integrity and privacy during transport. Transport uses standard HTTP packets. Encryption and integrity are provided by using Secure Socket Layer (SSL, sometimes referred to as TLS). This invention is compatible and portable to different computer operating systems and mobile devices, and is also lightweight, allowing for 'clientless' installation and removal or small-footprint (thin) client software installations. The invention can also secure mobile user communication links over public wireless hotspots or wired Internet links.

7 Claims, 6 Drawing Sheets

METHOD TO CREATE AN OSI NETWORK LAYER 3 VIRTUAL PRIVATE NETWORK (VPN) USING AN HTTP/S TUNNEL

This application claims priority from U.S. Provisional Application Ser. No. 60/913,712, filed in the United States Patent and Trademark Office Apr. 24, 2007, and entitled Method to create an OSI network layer 3 virtual private network (VPN) using an HTTP/S tunnel.

BACKGROUND OF THE INVENTION

The present invention pertains to computers communicating over large communication networks, such as the internet or wide area networks (WAN). The invention further relates to communication between computers over a large communication network where a client computer is accessing the network via connections provided by unknown parties or public services, where data transfer security and privacy for the client end-user is a concern.

Virtual Private Network (VPN) is a term to describe various methods used to encrypt, compartmentalize and privatize data by trusted computer systems when transmitted over insecure networks. VPNs create what is called a 'tunnel' through the insecure network connecting two or more of the trusted computer systems. Intermediaries in the network are prevented from seeing or tampering with data transmitted through the VPN tunnel, thus protecting the security and integrity of the data transmitted through the VPN. Tunneled and encrypted communication by VPN has traditionally been provided by companies to their employees for company use. The need for encrypting traffic by the general public has not been a focus of the VPN software, service and equipment providers. The creation and availability of numerous wireless hotspots that provide access to the Internet to the general public from public locations has changed the scope of how VPN should be delivered.

The proliferation of wireless hot spots, whether coffee shops giving wireless internet access to their customers or cities that prove such access to their residents, has dramatically increased the number of places from which people can access a main network. Now, the general public also has a need to ensure that their communications are encrypted, but instead of the 'typical' VPN deployment of encrypting traffic to and between a company's network(s), the general public would desire to have its traffic encrypted during transit to the Internet. The reason is that publicly provided Internet access links (either wireless or wired) can be monitored by the providers of those links without the knowledge of the end-user who is accessing the service. URLs, email, instant messaging, unencrypted authentication credentials and any other easily detectable traffic generated by the end-user can be monitored, logged, and archived by the local hotspot provider very easily. The end-user generated traffic, especially wireless, is also easily open to interception from a peer host within wireless range or that is accessing the same provider hotspot.

SUMMARY OF THE INVENTION

This invention addresses the general public's need for encrypted communication by establishing a secure connection from a client system to a server using HTTP/S POST and HTTP/S GET commands to establish a secure tunnel.

Because of this invention's efficient design and extremely low software footprint, there is an embodiment of this invention that requires no manual client software installation or removal on the end-user system before or after use. The 'clientless' usage functionality of this invention removes a major usability issue in delivery, since the typical end-user or administrator does not want the complexity of installing and configuring client-side VPN software in order to create tunnels to the server/gateway. Client software removal can proceed automatically as well after the end-user has finished using the VPN.

The standard client application software installation, if preferred by the end-user or administrator, is also very small (thin-client) and transparent in use. The thin-client provides very fast tunnel connect and disconnect functionality for the end-user who wishes to quickly 'scramble' their network communications when privacy or security is needed over an insecure network topology.

The basic architecture designed into this invention allows porting to new devices and operating systems very easily and quickly. Thus, versions of this invention can be quickly deployed for network capable mobile phones, portable data assistants (PDAs) and similar mobile devices. Supporting the client architecture on these devices is simplified by being computer operating system (OS) agnostic and relying on standard OS HTTP library implementations. In short, if the mobile device supports the web, it can use this invention.

An additional benefit of this invention over other types of VPNs, is that clients using this invention to encrypt their traffic are more likely to work seamlessly over the insecure network. Other types of VPNs use network ports or methods that may be either blocked or incompatible with the network topology that a client system is connected to. An example would be networks using NAT, which would be typical of wireless hotspots, but incompatible with certain VPNs. Another example would be VPN technologies using GRE protocols, which would typically be blocked on third party or public networks. This invention uses a commonly used protocol (HTTPS) and is fully compatible with NATted networks, and so is more likely to be used transparently to secure data where other VPN methods would fail.

DETAILED DESCRIPTION OF THE INVENTION

Figure 1:
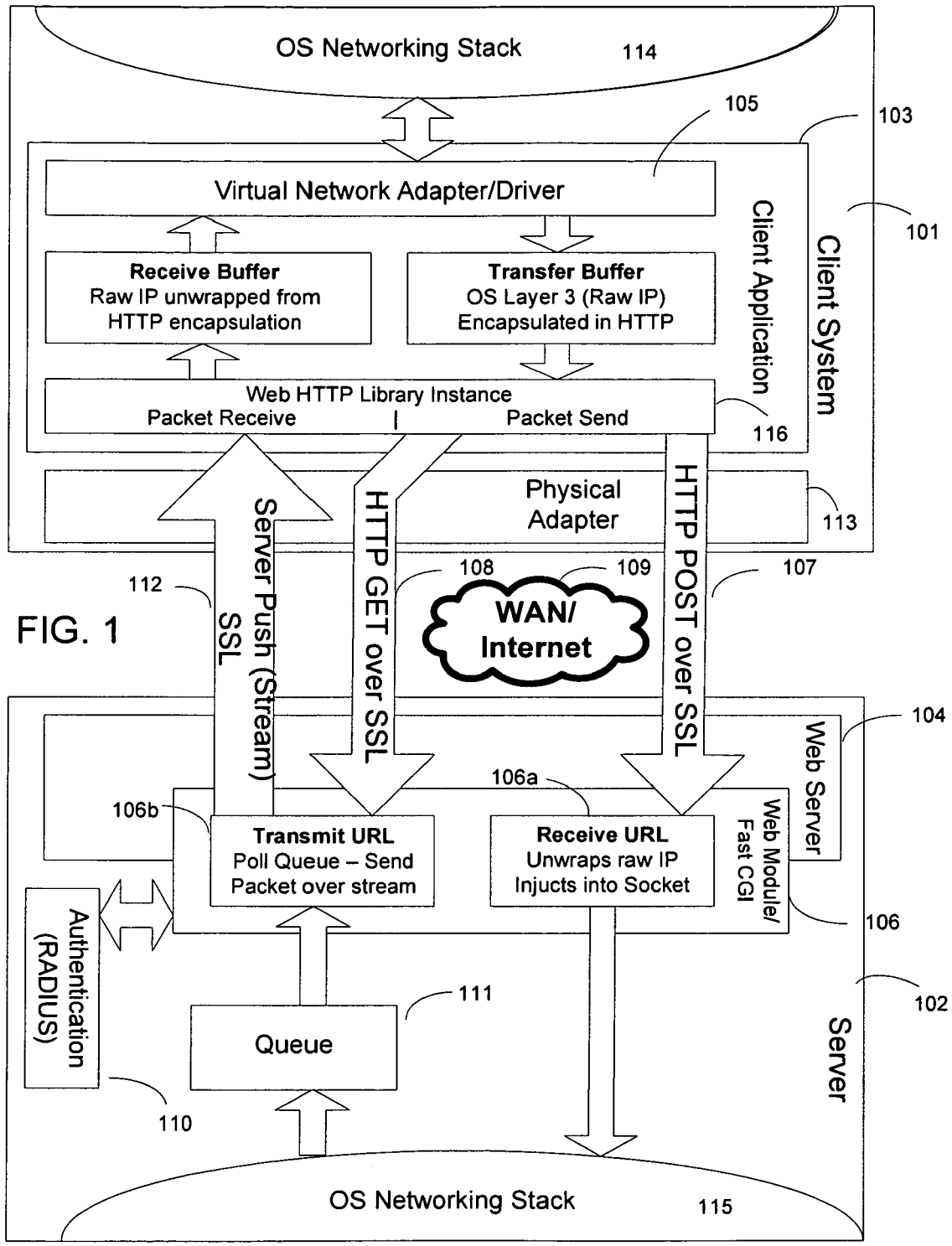
FIG. 1 is a diagram of the overview client/server transmit and receive flow chart.

FIG. 1 depicts an overview of this invention and how it is used to secure IP data packets over an insecure network creating a VPN between the client and server. A client system 101 running the client application 103 establishes a secure data transmit/receive tunnel to a server 102 over an insecure network topology 109.

In the embodiment depicted in FIG. 1, the client application 103 contains an integrated virtual network adapter driver 105, and is capable of transmitting and receiving data packets through the client system's physical network adapter 113. The virtual network adapter 105 obtains its own network addressing (in the embodiment depicted in FIG. 5 this is done via DHCP). This virtual network adapter is then used by the client system's operating system (OS) 114 to redirect transmit and receive data packets that normally would be sent or received directly to or from the physical network adapter 113. In effect, the installed virtual network adapter 105 now acts as the intermediary between the client computer OS 114 and the client computer physical network adapter 113. This allows selection and interception of IP packets, allowing them to be encrypted for transport over the VPN. With the network IP packets intercepted, the client application 103 can act upon the packets to secure them through encryption or otherwise.

The server 102 in FIG. 1 contains invention components that include a web server 104, an input/output module, such as the GCI module(s) 106, a credential authentication system, such as the RADIUS client, and a queue 111 for queuing packets generated in the server OS 115 and destined for the client system 101.

Figure 3:
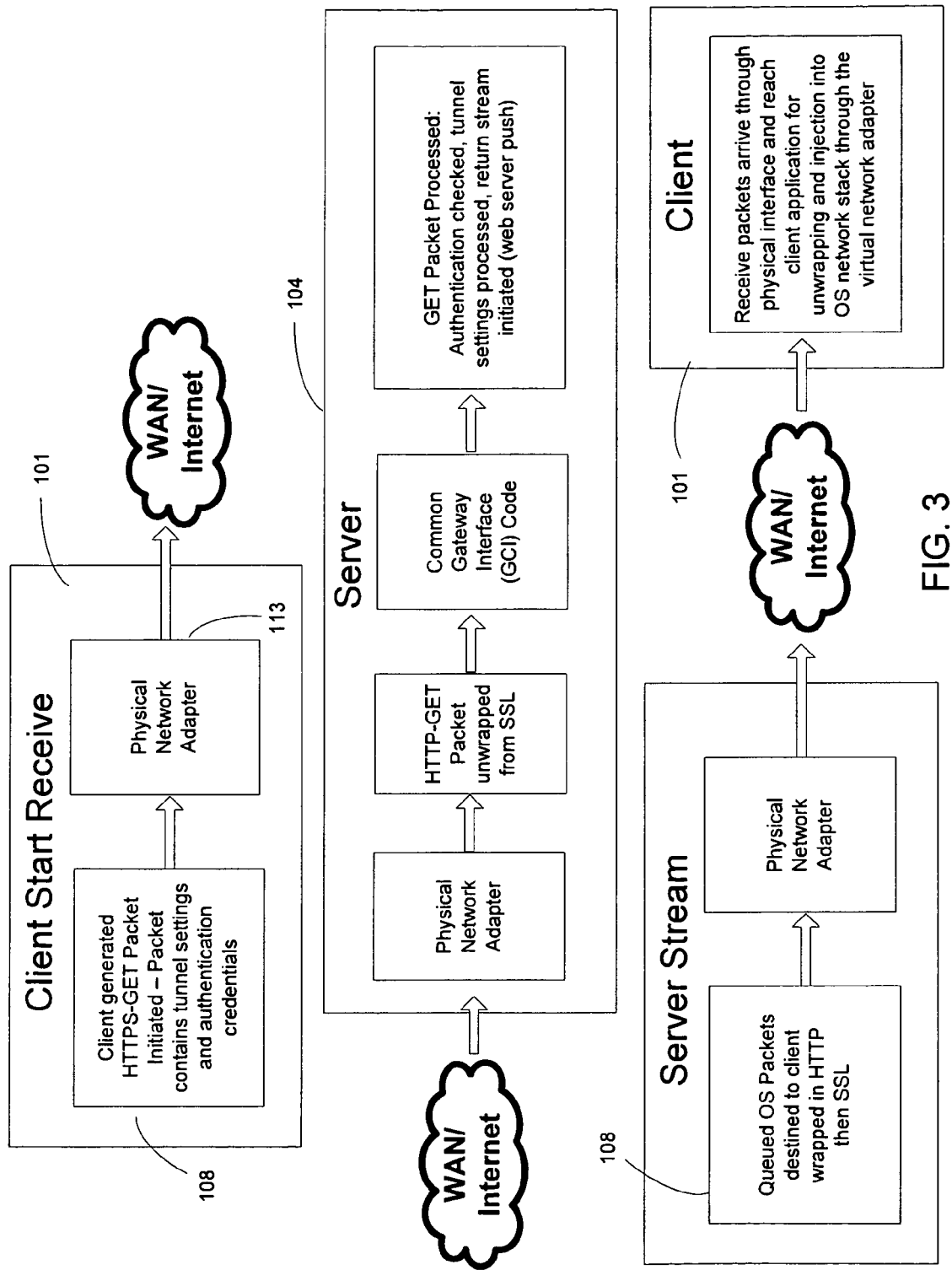
FIG. 3 is a diagram of the server to client secure packet receive sequence breakdown.

In accordance with the invention, communications from the client system 101 to the server 102 form a secure channel. Requested data is encapsulated the in IP packets 201 inside of HTTP/S packets 202. Making a request to the web server 104 for each incoming encapsulated packet 203 would be bandwidth intensive and inefficient. Instead, the invention forms an initial connection to the web server 104 to control how incoming (receive) packets to the client system 101 are handled. In FIG. 3, the client application 103 generates an initial connection by sending an HTTP/S-GET 108 to the web server 104 over SSL (HTTP/S) to a target URL (example: https://targetserver.com/clientreceive.cgi) over the client system's 101 physical network adapter 113. This target URL addresses a server-side component. In the embodiment presented in FIG. 1, the addressed server-side component is the Transmit URL 106b in the CGI module 106 hosted by the web server 104. Note that the Transmit URL 106b and the Receive URL 106a may be different URLs or the same URL.

The server 102 will then establish a secure channel, the Server Push Stream 112. The HTTP/S-GET packet 108 generated by the client system 101 contains authentication credentials or other tunnel settings specific to this client system 101. Various authentication methods currently known in the art can be used with this invention, such as methods described inside the HTTP standard itself for use with HTTP connections to web servers to other authentication methods unrelated to HTTP. The embodiment in FIG. 1 shows credentials being passed inside the HTTP/S-GET request 108 and the client system 101 is authenticated when the invention CGI module 106 passes those credentials to a standard RADIUS client 110 on the server 102. Once the client system 101 has been authenticated, CGI module 106 on the web server 104 will then start a persistent connection, a web server "push" method, to establish the Server Push stream 112 to the client system 101. This connection is used to send any encapsulated IP packets (See FIG. 3) destined to the client system 101. The Server Push stream 112 can be any web server 'push' connection established using special HTTP connection types such as Content-Type multipart/x-mixed-replace; or can be contained as features in newer web based languages such as Asynchronous JavaScript™ and XML (Ajax).

Communication from client system 101 to server 102 takes place as follows: Transmit IP data packets 201, destined from the client system 101 to the server 102 over the invention's VPN, are placed inside an HTTP packet 202 as POST data by the invention client application 103. A call is then made to HTTP libraries 116 on the computer system to create a connection to the web server 104 component of the server 102. The packet containing the IP packet as POST data is then secured using SSL and then sent to the web server 104 as an HTTP/S POST transmission 107 over the client system's 101 physical network adapter 113. The target of the HTTP/S POST, the web server's 104 input/output module, can vary based on what is best suited to the type of application the invention is applied to. The embodiment in FIG. 1 uses common gateway interface (CGI) modules. The target in this embodiment is the Receive URL 106a in the CGI module 106 hosted by the web server 104 software (example: https://targetserver.com/clientsend.cgi). This CGI module 106 is discussed in greater detail in the server section below. This client generated HTTP/S-POST packet can also contain authentication credentials or other tunnel settings specific to this client system 101.

Figure 2:
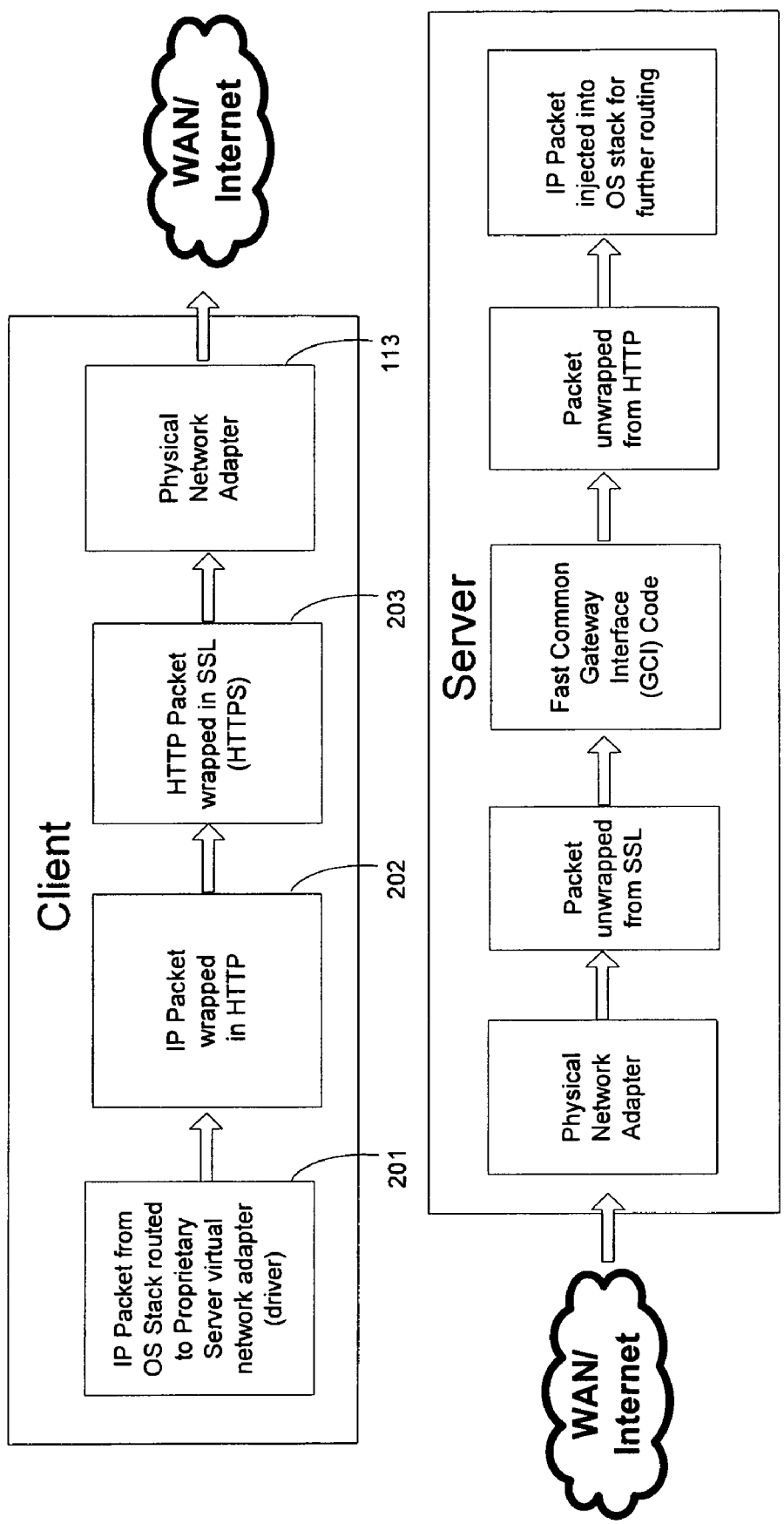
FIG. 2 is a diagram of the client to server packet transmission sequence breakdown.
Figure 4:
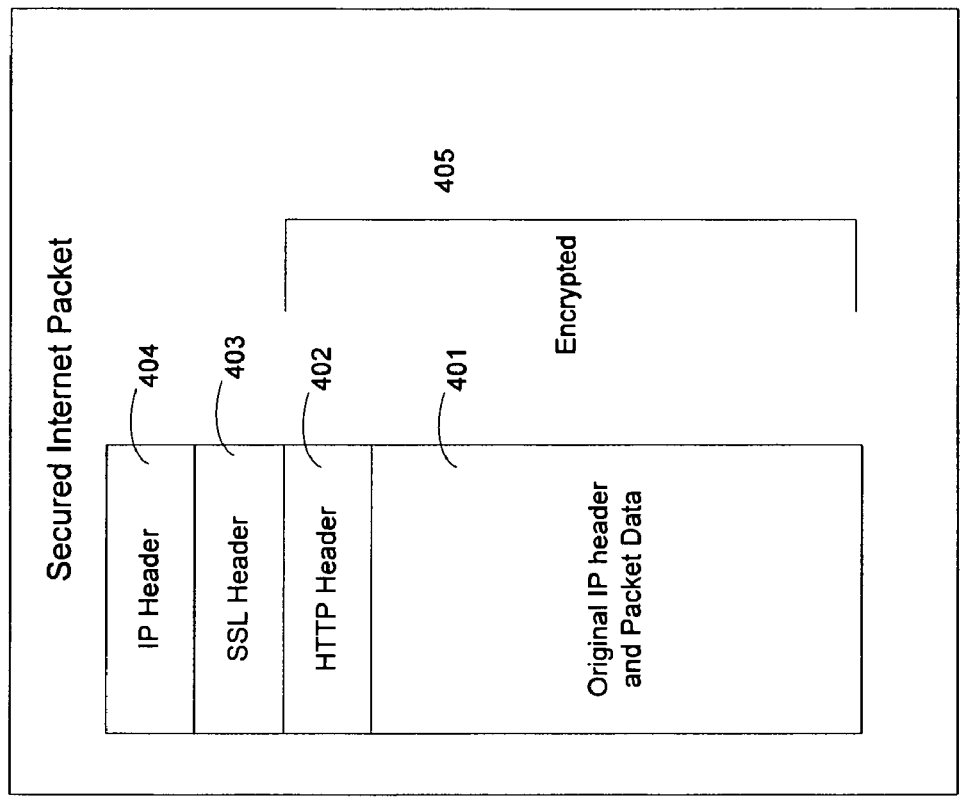
FIG. 4 is a diagram of a model secured internet packet that uses the invention.

Communications packets arrive at the server 102 from the client systems as an HTTP/S-POST using SSL 107. The web server 104 on the server 102 accepts these packets over its network listening port. Once at the web server 104, the SSL packet 203, is validated, decrypted and the resulting HTTP/S-POST (see FIG. 2) containing the original client system IP packet 201 is passed into the input/output module where the original packet and any authentication credentials sent by the client system 101 (see FIG. 4) can be extracted. In the embodiment shown in FIG. 1, POST data is passed into the Receive URL 106a in the CGI Module 106. The CGI Module 106 then processes the POST data to extract the original IP packet. The original IP packet is injected into the server's OS networking stack 115 for routing to its intended destination, which can either be to networks local or external to the server, depending upon the IP addressing of the original packet generated in the client system's OS 114 prior to manipulation by the client application 103. The CGI module 106 can also be implemented to perform special-case processing to handle network broadcast or DHCP communications (see FIG. 5).

Communication from the server 102 to the client system 101 takes place as follows: The Server Push stream 112 is started by the server's CGI module 106 through the web server 104 to the client application 103 on the client system 101. Data packets are then streamed using SSL to the client system 101 over the Server Push stream 112 without additional HTTP/S-GET requests. Once the Server Push stream 112 is established, the input/output module listens for IP packets from the queue 111. Using server routing rules, the queue 111 separates out the traffic arriving on the server 102 and destined to client system(s) 101 connected to the VPN. The server's queue 111 performs a similar task to the client application's virtual network adapter on the client system 101: it intercepts IP packets destined for the VPN client system(s) and ignores other network traffic, such as network management traffic, monitoring traffic or other traffic unrelated to the VPN communications. The queue 111 gathers IP packets addressed to VPN client system(s), and forwards them to the input/output module (the CGI Module 106 in the embodiment shown in FIG. 1). Once the IP packets are forwarded from the queue 111 to the CGI Module 106, they are then sent securely to the client system 101 over the previously established the Server Push stream 112.

Figure 5:
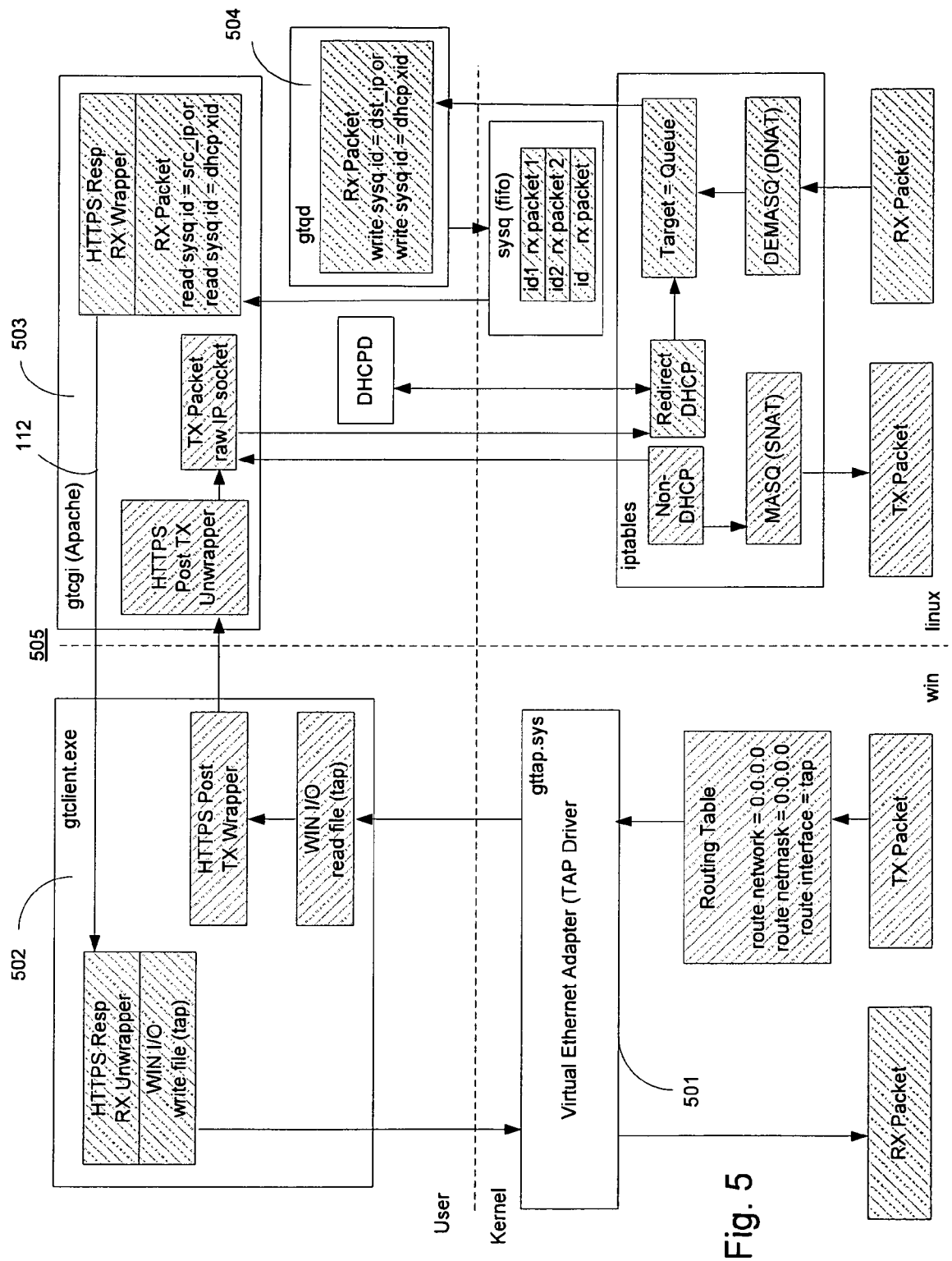
FIG. 5 is a detailed diagram of the HTTP/S VPN architecture implemented in user/kernel space.

FIG. 5 shows details of the invention components in relation to their respective computer system components. In FIG. 5, the user space (the top half of FIG. 5, the high level application processes) is separated from the kernel space (the bottom half of FIG. 5, the low-level OS processes), and the client system 101 (the left half of FIG. 5) is separated from the server 102 (the right half of FIG. 5). The client application's virtual network adapter 501 is shown in the kernel since this is considered a low-level driver used by the client system OS.

The invention components in FIG. 5 also include the client application's virtual network adapter, gttap.sys 501; the client application's system that creates a VPN, gtclient.exe 502; a CGI Module on the web server, gtcgi 503; the queue 111 on the server, gtqd 504; the persistent connection from gtcgi 503 to the Server Push stream 112 gtclient.exe 502.

The embodiment shown in FIG. 5 represents a client system running the Windows OS and a server running the Linux OS and the Apache web server application.

Figure 6:
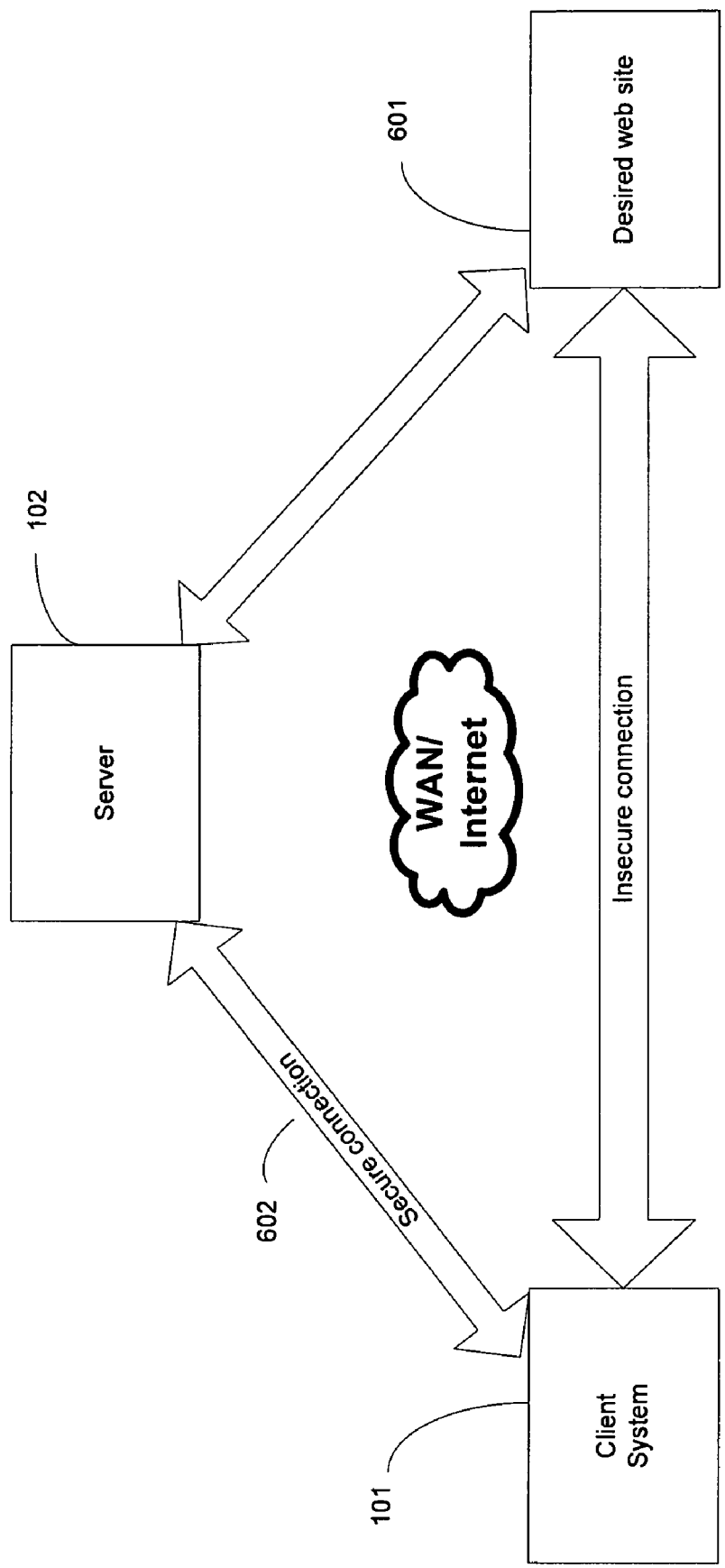
FIG. 6 is a diagram depicting the server as an intermediary between the client system and a desired web site.

FIG. 6 illustrates one use of the invention in which the server 102 acts as an intermediary between the client system 101 and a desired web site 601, and a secure client-server communication connection 602 is set up to protect a client who is accessing the internet through a wireless hotspot.

The client application 103 is designed to be thin (taking up few of the client system's resources) and transparent to users. Other embodiments eliminate the need for a client application 103 by modifying the web server 104 or input/output module on the server 102 to simulate the functionality of the client application 103.

The invention claimed is:

1. A method of creating an OSI Network Layer 3 virtual private network connecting a client system to a server using an HTTP/S tunnel comprising the steps of:
   generating an HTTP/S-GET request in said client system, said HTTP/S-GET request containing authentication credentials and other tunnel settings specific to said client system;
   sending said HTTP/S-GET request from said client system to an input/output module on said server using SSL;
   authenticating said authentication credentials;
   initiating a persistent HTTP connection from said server to establish an HTTP connection type server PUSH stream to said client system;
   creating a send IP packet on said client system addressed to a remote site, encapsulating said send IP packet to form an HTTP packet, encapsulating said HTTP packet in SSL to form an HTTP/S-POST packet, and sending said HTTP/S-POST packet to said server;
   receiving said HTTPS-POST packet at said server and validating said HTTP/S-POST packet as a authentic SSL packet from said client system;
   extracting said send IP packet from said HTTP/S-POST packet;
   injecting said send IP packet into said server's OS networking stack for routing to its intended remote site;
   receiving at said server a receive IP packet from said remote site addressed to said client system;
   placing said receive IP packet into a queue on said server;
   removing said receive IP packet from said queue, encapsulating said reply IP packet within an HTTP packet, and encapsulating said HTTP packet within SSL to form an HTTP/S packet;
   streaming said HTTP/S packet to said client system over said server PUSH stream;
   receiving said HTTP/S packet on said client system and extracting said receive IP packet.

2. The method of creating an OSI Network Layer 3 virtual private network claimed in claim 1, wherein the step of authenticating said authentication credentials further comprises the step of sending said authentication credential to a RADIUS client.

3. The method of creating an OSI Network Layer 3 virtual private network claimed in claim 1, wherein the step of sending said HTTP/S-GET request from said client system to an input/output module on said server using SSL further comprises directing said HTTP/S-GET request to a target URL on a web server component of said server.

4. The method of creating an OSI Network Layer 3 virtual private network claimed in claim 3, wherein said step of sending said HTTP/S-GET request to a target URL further comprises sending said HTTP/S-GET request to a transmit URL component located within a CGI module component in said web server.

5. The method of creating an OSI Network Layer 3 virtual private network claimed in claim 4, wherein said step of sending said HTTP/S-POST packet to said server further comprises sending said HTTP/S-POST packet to a Receive URL component located within said CGI module component in said web server.

6. The method of creating an OST Network Layer 3 virtual private network claimed in claim 1, wherein said HTTP connection type server PUSH stream further comprises a Content-Type multipart/x-mixed-replace stream.

7. The method of creating an OST Network Layer 3 virtual private network claimed in claim 1, wherein said HTTP connection type server PUSH stream further comprises an Asynchronous JavaScript XML (AJAX) stream.

\* \* \* \* \*